(12) United States Patent
Dokuni

(10) Patent No.: US 7,986,784 B2
(45) Date of Patent: Jul. 26, 2011

(54) IMAGE PROCESSING APPARATUS

(75) Inventor: Kenji Dokuni, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 800 days.

(21) Appl. No.: 12/014,935

(22) Filed: Jan. 16, 2008

(65) Prior Publication Data

US 2008/0218805 A1 Sep. 11, 2008

(30) Foreign Application Priority Data

Mar. 7, 2007 (JP) ................................ 2007-056788

(51) Int. Cl.
*H04N 1/44* (2006.01)
*G06F 11/30* (2006.01)

(52) U.S. Cl. ........................................ 380/243; 713/193

(58) Field of Classification Search .................. 380/243; 713/193
See application file for complete search history.

(56) References Cited

U.S. PATENT DOCUMENTS

| | | | | |
|---|---|---|---|---|
| 5,619,571 A * | 4/1997 | Sandstrom et al. | ........... | 380/200 |
| 6,456,985 B1 | 9/2002 | Ohtsuka | | |
| 7,015,933 B2 * | 3/2006 | Han et al. | ...................... | 345/619 |
| 7,921,288 B1 * | 4/2011 | Hildebrand | ................... | 713/166 |
| 2002/0035697 A1 * | 3/2002 | McCurdy et al. | ............. | 713/200 |
| 2002/0135813 A1 | 9/2002 | Tanimoto | | |
| 2003/0231767 A1 * | 12/2003 | Carbajal | ...................... | 380/200 |
| 2004/0143760 A1 * | 7/2004 | Alkove et al. | ................. | 713/201 |
| 2004/0194027 A1 * | 9/2004 | Suzuki et al. | ................. | 715/515 |
| 2004/0196970 A1 * | 10/2004 | Cole | ................................ | 380/1 |
| 2005/0091519 A1 * | 4/2005 | Peterson | ....................... | 713/193 |
| 2005/0108240 A1 * | 5/2005 | Bolosky et al. | .................... | 707/9 |
| 2005/0125676 A1 | 6/2005 | Fujiwara et al. | | |
| 2005/0141010 A1 | 6/2005 | Kanai | | |
| 2005/0175182 A1 * | 8/2005 | Ueno et al. | ..................... | 380/277 |
| 2005/0209995 A1 * | 9/2005 | Aksu et al. | ........................ | 707/1 |
| 2005/0262340 A1 | 11/2005 | Rabb | | |
| 2006/0072749 A1 | 4/2006 | Gava | | |
| 2006/0251246 A1 * | 11/2006 | Matsui | ............................ | 380/28 |
| 2007/0081189 A1 * | 4/2007 | Kamei et al. | ................. | 358/1.18 |
| 2007/0250540 A1 * | 10/2007 | Hsu | ............................... | 707/200 |
| 2008/0034222 A1 * | 2/2008 | Torisaki et al. | ............... | 713/193 |
| 2008/0037789 A1 * | 2/2008 | Motohashi | .................... | 380/277 |
| 2008/0229041 A1 * | 9/2008 | Baek et al. | ..................... | 711/163 |

(Continued)

FOREIGN PATENT DOCUMENTS

EP 1 367 826 A1 12/2003

(Continued)

OTHER PUBLICATIONS

Official communication issued in counterpart Japanese Application No. 2007-056788, mailed on Feb. 24, 2009.

(Continued)

Primary Examiner — Techane Gergiso
(74) Attorney, Agent, or Firm — Keating & Bennett, LLP

(57) ABSTRACT

An image processing apparatus prevents reproduction and display of an image file in a viewer of a client PC, etc., by encrypting "fileType" and "version" contained in an Image File Header (IFH), which is file format information, and "tagCount", "sig_tag0 to 2", "type0 to 2", "pointer0 to 2", and "size0 to 2", which are file structure information, of small amounts of data, without encrypting image data (data0, data1, data2) themselves each having a large amount of data in the image file of a Tagged Image File Format (TIFF format).

6 Claims, 8 Drawing Sheets

U.S. PATENT DOCUMENTS

2008/0279380 A1* 11/2008 Hayashi .................. 380/243

FOREIGN PATENT DOCUMENTS

| | | |
|---|---|---|
| JP | 05-095352 A | 4/1993 |
| JP | 6-164951 A | 6/1994 |
| JP | 2001-236272 A | 8/2001 |
| JP | 2002-229452 A | 8/2002 |
| JP | 2002-318535 A | 10/2002 |
| JP | 2003-069942 A | 3/2003 |
| JP | 2003-264829 A | 9/2003 |
| JP | 2005-086582 A | 3/2005 |
| JP | 2005-173640 A | 6/2005 |
| WO | 2005/071873 A1 | 8/2005 |

OTHER PUBLICATIONS

Official communication issued in counterpart European Application No. 08000323.9, mailed on Jun. 6, 2008.

Official Communication issued in corresponding Japanese Patent Application No. 2007-056788, mailed on Mar. 9, 2010.

Katsuta et al., "A New Digital Scrambling Method for Compressed Video Signals", Institute of Electronics, Information and Communications Engineers Technical Research Report, Dec. 7, 1992, vol. 92, No. 355, pp. 19-28.

* cited by examiner

FIG. 5

SELECT ENCRYPTION LEVEL OF SCAN FILE

1: NO ENCRYPTION

2: LEVEL 1 (WEAK ENCRYPTION STRENGTH)

3: LEVEL 2 (MODERATE ENCRYPTION STRENGTH)

4: LEVEL 3 (STRONG ENCRYPTION STRENGTH)

RETURN

IMAGE PROCESSING APPARATUS

CROSS-REFERENCE TO RELATED APPLICATIONS

This application claims priority under 35 U.S.C. 119 to Japanese Patent Application No. 2007-56788, filed on Mar. 7, 2007, which application is hereby incorporated by reference in its entirety.

BACKGROUND OF THE INVENTION

1. Field of the Invention

The present invention relates to image processing apparatus, specifically, to an image processing apparatus for outputting image data of a scanned document as a file.

2. Description of the Related Art

An image processing apparatus for generating a file based on the image data of the scanned document, and storing the file in its storage device or transferring the file to a client PC, etc., connected thereto via a network conventionally exists. In recent years, security enhancement of information is desired, and an image processing apparatus that encrypts the file of the generated image data for the purpose of preserving confidentiality of the information has been invented as described in Japanese Laid-Open Patent Publication No. 2005-86582.

However, the file of the image data has a great amount of data and the calculation amount in the process of encrypting the file of the image data becomes large, whereby a great amount of processing load is imposed on a calculation processing device of the image forming apparatus. Thus, the processing ability of other functions of the image processing apparatus tends to decrease when executing the encryption process on the file of the image data.

SUMMARY OF THE INVENTION

In order to overcome the problems described above, preferred embodiments of the present invention provide an image processing apparatus in which a great processing load is not imposed on a calculation processing device when executing an encryption process, and in which the processing ability of other functions is not influenced.

An image processing apparatus according to a preferred embodiment of the present invention is an image processing apparatus for outputting image data of a scanned document as a file, the image processing apparatus including an image data generation unit arranged to generate image data by reading the document; an image file generation unit arranged to generate an image file from the image data generated by the image data generation unit; and an encryption unit arranged to encrypt file format information and file structure information contained in the image file generated by the image file generation unit.

According to such configuration, in the image processing apparatus for outputting image data of a scanned document as a file, the image data is generated by the image file generation unit by reading the document by the image data generation unit, and the image file is generated by the image generation unit from the image data generated by the image data generation unit. The file format information and the file structure information contained in the image file generated by the image file generation unit are encrypted by the encryption unit. The file format information is information indicating the format of the file, and the file structure information is information related to the structure of the file.

The viewer for displaying the image based on the file of the image data specifies the encoding method of the file, the data structure of the file, and the like based on the file format information and the file structure information contained in the header, etc., of the file, and reproduces and displays the image data. Therefore, since the viewer cannot reproduce and display the image data contained in the file if the file format information and the file structure information are encrypted, the purpose of encryption to prevent reproduction and display of image data can be achieved without encrypting the image data itself.

The file format information and the file structure information have a significantly small amount of data compared to the image data. Therefore, only a small amount of calculation is necessary for the encryption process, and thus the processing load imposed on the calculation processing device such as the CPU becomes small when executing the encryption process, and adverse effects such as decreases in the processing ability of other functions of the image processing apparatus do not occur. Since the calculation amount is small, the time necessary for the encryption process can be reduced.

In another image processing apparatus according to a preferred embodiment of the present invention, the file structure information includes at least information on a stored position of the image data.

According to such configuration, at least information concerning the stored position of the image data is contained in the file structure information. Since the information concerning the stored position of the image data is encrypted, the viewer cannot specify the stored position of the image data in the file in the encrypted state, and the image data cannot be read out from the file to reproduce and display the image. Therefore, since the information concerning the stored position of the image data has a smaller amount of data than the image data, the amount of data to be encrypted becomes small, the amount of calculation in the encryption process becomes small, and the processing load imposed on the calculation processing device such as CPU can be reduced.

In another image processing apparatus according to a preferred embodiment of the present invention, the image file generation unit generates an image file containing a plurality of image data generated by the image data generation unit, the file structure information includes information indicating stored positions of the plurality of image data contained in the image file, and the encryption unit encrypts at least information indicating the stored position of the image data stored at a position closest to the head of the image file.

According to such configuration, the image file containing a plurality of image data generated by the image data generation unit is generated by the image file generation unit, and the information indicating stored positions of the plurality of image data contained in the image file is contained in the file structure information. At least information indicating the stored position of the image data stored at a position closest to the head of the image file is encrypted by the encryption unit.

Therefore, since the information indicating the stored position of the image data stored at the position closest to the head of the image file is encrypted, the viewer cannot reproduce and display the first image data in the encrypted state. Thus, reproduction and display of all the image data cannot be performed in the viewer, which reproduces subsequent image data under the condition that the first image data can be reproduced. Since the information indicating the stored position of the image data stored at the position closest to the head of the image file has a smaller amount of data than the image data, the amount of data to be encrypted becomes small, the amount of calculation in the encryption process becomes small, and the processing load imposed on the calculation processing device such as the CPU can be reduced.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5 is an explanatory view illustrating an example of a screen displayed on a liquid crystal display of a display unit when the scan-to-folder function is executed in the Internet facsimile apparatus.

DETAILED DESCRIPTION OF PREFERRED EMBODIMENTS

An Internet facsimile apparatus 1 serving as one example of the image processing apparatus according to a preferred embodiment of the present invention will now be described with reference to the drawings. The Internet facsimile apparatus 1 preferably is a so-called facsimile multifunction peripheral having a facsimile function, Internet facsimile function, e-mail function, scan function, copy function, print function, voice communication function, and the like. The Internet facsimile apparatus 1 preferably is installed in offices, etc., and is connected to Public Switched Telephone Networks (PSTN) 2 or Local Area Network (LAN) 3. In addition to the Internet facsimile apparatus 1, a client Personal Computer (PC) 4 and the like are also connected to the LAN 3. Furthermore, a router 5 is also connected to the LAN 3, and Internet 6 is connected to the LAN 3 by way of the router 5.

Figure 1:
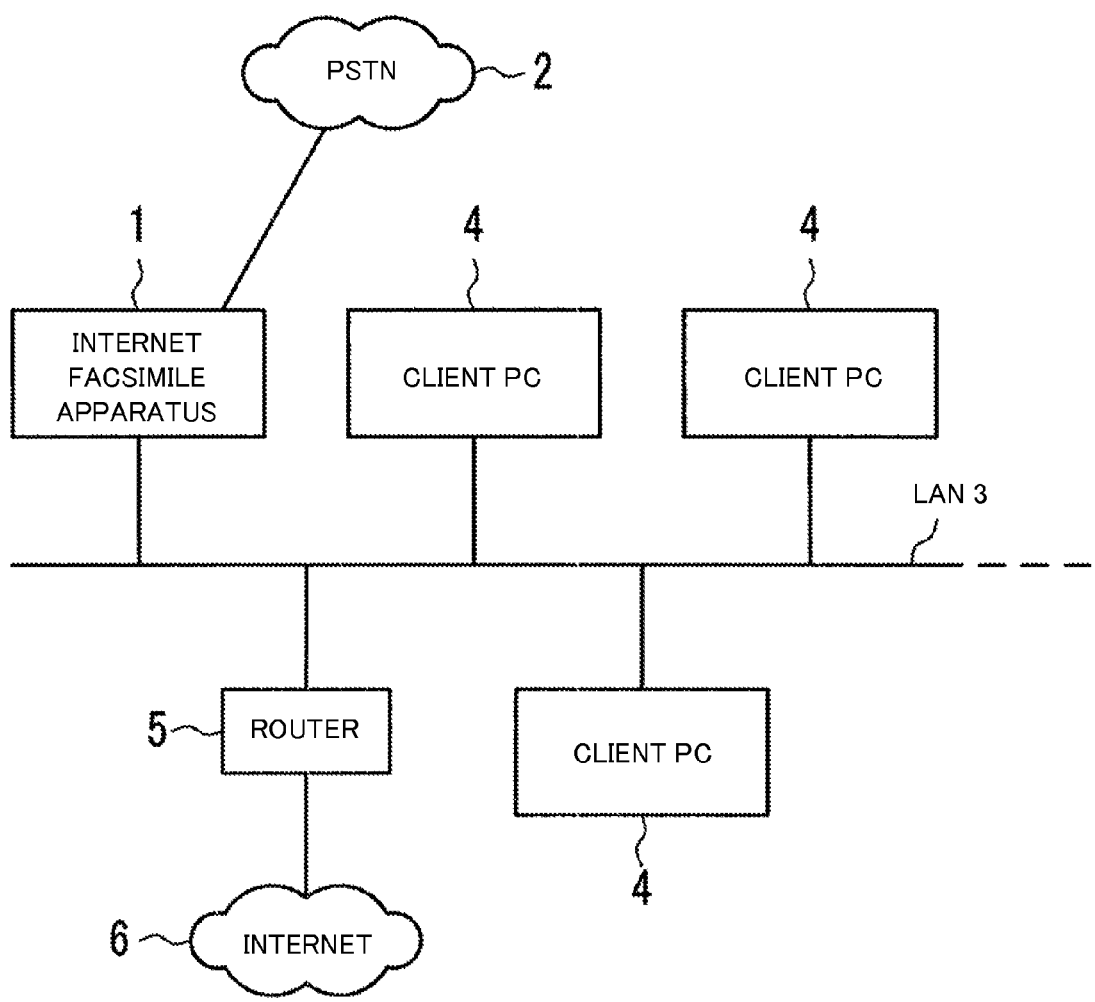
FIG. 1 is an explanatory view illustrating a configuration example of a network installed with an Internet facsimile apparatus according to a preferred embodiment of the present invention.
Figure 2:
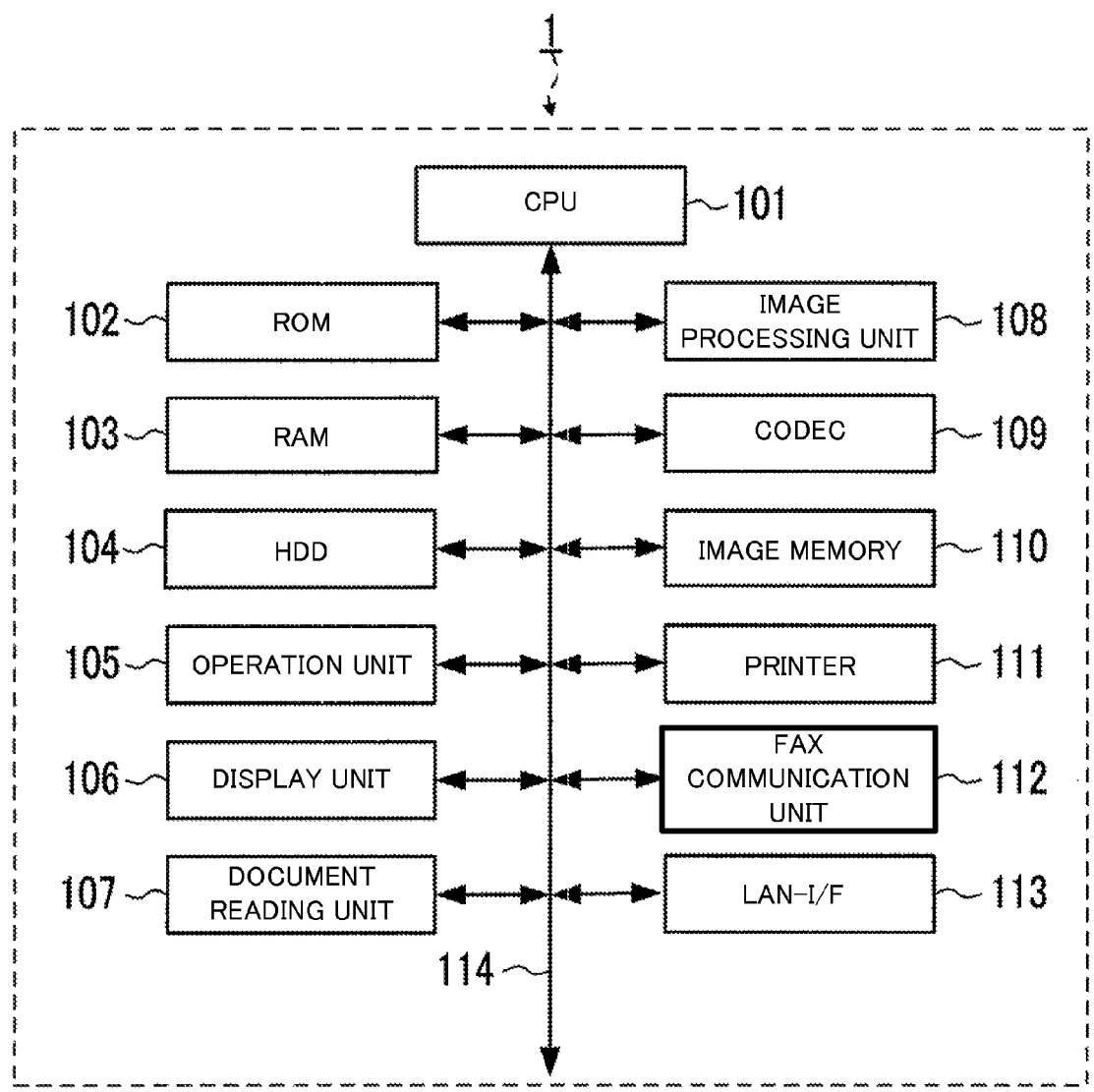
FIG. 2 is a block diagram illustrating a configuration example of the Internet facsimile apparatus.

FIG. 2 is a block diagram illustrating a configuration example of the Internet facsimile apparatus 1. As illustrated in FIG. 2, the Internet facsimile apparatus 1 preferably includes a central Processing Unit (CPU) 101, a Read Only Memory (ROM) 102, a Random Access Memory (RAM) 103, an Hard Disk Drive (HDD) 104, an operation unit 105, a display unit 106, a document reading unit 107, an image processing unit 108, a Coder and Decoder (CODEC) 109, an image memory 110, a printer 111, a FAX communication unit 112, and a Local Area Network Interface (LAN-I/F) 113, where each units 101 to 113 are communicably connected by a bus 114.

The CPU 101 controls the operation of each unit of the Internet facsimile apparatus 1 according to a control program stored in the ROM 102. The ROM 102 stores the control program, etc., for controlling the operation of each unit of the Internet facsimile apparatus 1 via the CPU 101. The RAM 103 stores various data, etc., such as setting information used in the operation of the Internet facsimile apparatus 1 in a readable and writable state, and also serves as a work area of the CPU 101. The HDD 104 performs storing of the image data, transmitted and received with the facsimile function, and the like.

Although not illustrated, the operation unit 105 includes a start key for instructing the start of reading (scanning) operation of the document, a ten key for inputting facsimile number, number of copies, etc., a character input key for inputting characters, a cursor key for specifying the operation target, and the like. The display unit 106 includes a Liquid Crystal Display (LCD) (operation panel) of touch panel type for displaying various set states, the operation state of the apparatus 1, and the like with characters or figures, a Light Emitting Diode (LED) lamp for displaying through light-up and light-off. The display of the liquid crystal display is changed in response to the operation of each key on the operation unit 105 or the touch to the panel of the liquid crystal display of the display unit 106, and various inputs can be made by operating on each key of the operation unit 105 corresponding to the display of the liquid crystal display or by touching the panel of the liquid crystal display.

The document reading unit 107 reads the image of the document and generates image data, and although not illustrated, includes a Flat Bed Scanner (FBS) for reading the document placed on a transparent copy plate, and an Automatic Document Feeder (ADF) for transporting the document so as to read the document placed on a document tray.

The image processing unit 108 performs processes such as color adjustment, color space conversion, and binarization on the image data output from the document reading unit 107. The CODEC 109 encodes the image data processed by the image processing unit 108 and the like, and decodes the encoded image data. The image data input to the CODEC 109 is encoded based on JPEG, MH, MR, MMR, JBIG method and the like, and stored in the image memory 110. The CODEC 109 also can execute encryption process according to a predetermined encryption algorithm, and can encrypt a file in a Tagged Image File Format (TIFF format) including the image data encoded in JPEG method and the like, as hereinafter described.

The printer 111 prints and outputs the image data read out from the image memory 110 and decoded by the CODEC 109.

The FAX communication unit 112 performs facsimile (FAX) communication of the image data of the document, and although not illustrated, includes a Modulator-DEModulator (MODEM) and a Network Control Unit (NCU). The MODEM performs modulation and demodulation of transmitted/received data according to recommendation V.34 standard or standards similar thereto of International Telecommunication Union Telecommunication Standardization Sector (ITU-T) and the like. The NCU is a line network control device for making a call or hanging up a call by controlling the telephone line, and is connected to the PSTN 2. A G3 facsimile apparatus, etc., is communicably connected to the PSTN 2 in addition to the Internet facsimile apparatus 1, so that the Internet facsimile apparatus 1 can transmit or receive the image data with the G3 facsimile apparatus, etc., through facsimile communication.

The LAN-I/F 113 enables the connection of the Internet facsimile apparatus 1 to the LAN 3. The client PC 4 and the like are also connected to the LAN 3, so that the Internet facsimile apparatus 1 can communicate data with the client PC 4 and the like. Furthermore, the Internet facsimile apparatus 1 is connected to other Internet facsimile apparatuses, etc., on the Internet 6 by way of the LAN 3 and router 5, and can perform Internet facsimile communication with the other Internet facsimile apparatus etc. The Internet facsimile communication is a communication for transmitting/receiving e-mails attached with a file (image data of Tagged Image File Format (TIFF)-S format in Simple Mail Transfer Protocol (SMTP)).

Such an Internet facsimile apparatus 1 has a so-called scan-to-folder function. The scan-to-folder function is a function for transferring the file generated from the image data of the document read in the document reading unit 107 to a folder of the client PC 4 registered in advance or to a folder of an arbitrary client PC 4 specified individually. In the Internet facsimile apparatus 1 according to a preferred embodiment of the present invention, the file (hereinafter referred to as "image file") of the image data of the document is encrypted in view of enhancing the security, and the encrypted file is transferred to the folder of the client PC 4.

The image file has a large amount of data, and generally, encryption of the image file requires a great amount of calculation thereby imposing a great amount of load on the CPU 101, whereby the processing ability of other functions by the CPU 101 decreases when executing the encryption process. Thus, in the Internet facsimile apparatus 1 according to a preferred embodiment of the present invention, only the information indicating the format of the file (hereinafter referred to as "file format information") and information indicating the structure of the file (hereinafter referred to as "file structure information") of the data of the image file are encrypted. The viewer cannot specify the format of the image file or specify the position, etc., of the image data in the file, and thus cannot appropriately reproduce and display the image if the file format information and the file structure information having a significantly small amount of data compared to the image data are encrypted even if the image data having a great amount of data in the file is not encrypted. Therefore, reproduction and display of the image file are inhibited with a very small amount of calculation, and the purpose of encryption to preserve confidentiality of the image information is achieved.

Figure 3:
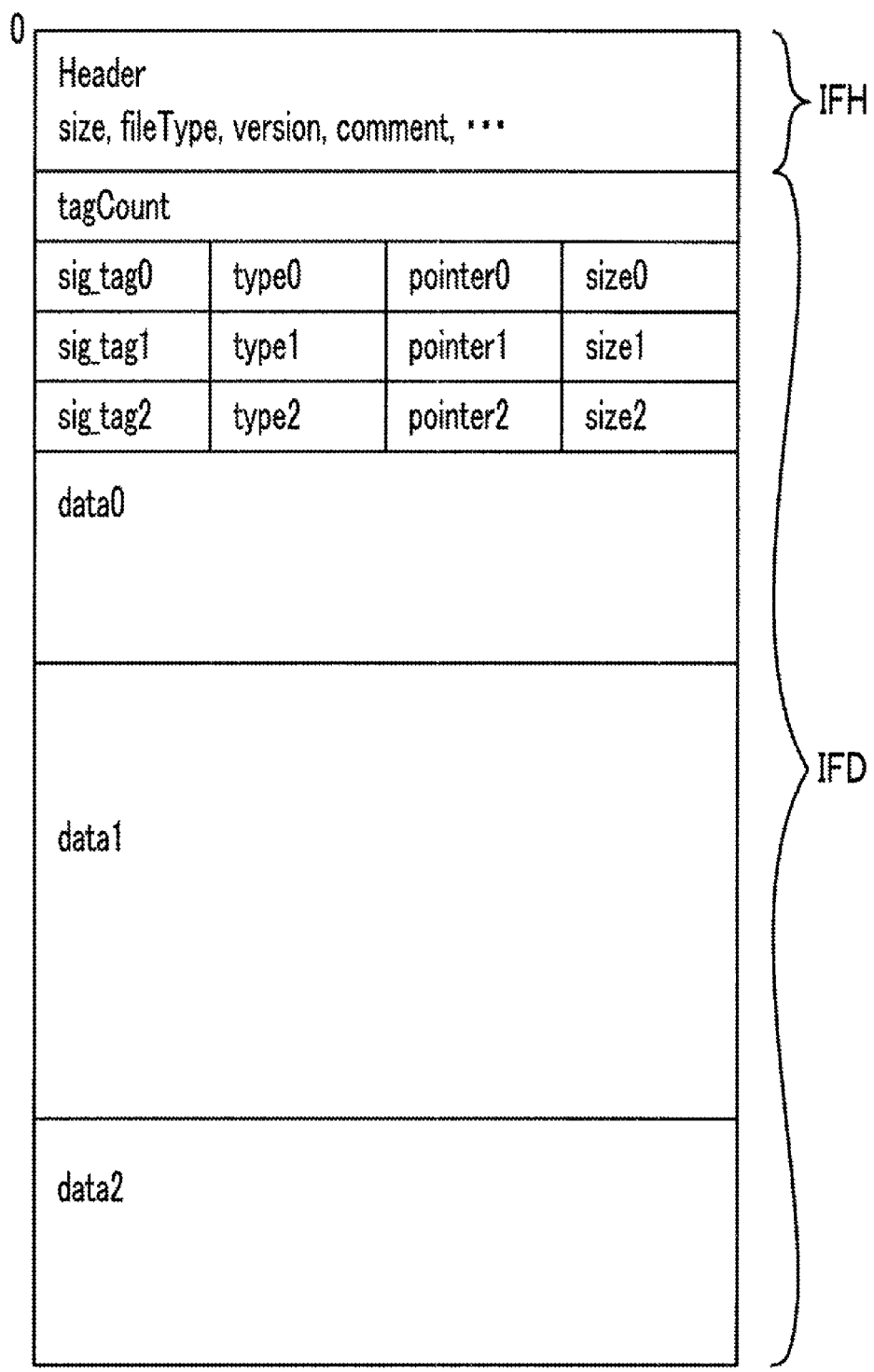
FIG. 3 is an explanatory view illustrating data structure of a TIFF file generated by the Internet facsimile apparatus.

In the Internet facsimile apparatus 1, the image data generated by scanning the document in the document reading unit 107 is formed as the file of TIFF format (hereinafter referred to as "TIFF file"). As illustrated in FIG. 3, the TIFF file includes an Image File Header (IFH) and an Image File Directory (IFD). The IFH is the header of the file, and includes information (size) indicating the amount of data of the entire file, information (fileType) indicating that the file is TIFF format, information (version) indicating the version of the TIFF format, information (comment) indicating comment, and the like. Here, the information (File Type) indicating that the file is TIFF format and the information (version) indicating the version correspond to "file format information". Only the information (fileType) indicating that the file is TIFF format may configure the "file format information".

The IFD includes information (hereinafter referred to as "tag information") referred to as tag indicating the kind of data stored in the file, information (tagCount) indicating the number of tag information, and stored data (image data). Each tag information includes information (sig_tag) indicating the type of tag information, information (type) indicating the expressive form of the stored data, information (pointer) indicating the position where the stored data (image data) is stored, and information (size) indicating the amount of the stored data (image data). Here, the "tagCount" and the tag information correspond to "file structure information". The information (pointer) indicating the position where the image data is stored is the information indicating the offset value from a head address of the TIFF file to a storage start address of the image data. In the example of FIG. 3, three image data data0, data1, and data2 are stored in one TIFF file. The tag information corresponding to data0 is sig_tag0, type0, pointer0, and size0; the tag information corresponding to data1 is sig_tag1, type1, pointer1, and size1; and the tag information corresponding to data2 is sig_tag2, type2, pointer2, and size2.

As apparent from the example of FIG. 3, a plurality of image data are stored in the file of TIFF format. Therefore, the image data of a plurality of documents read by the document reading unit 107 can be stored in the file of TIFF format. Furthermore, even if there is only one image data (original image data) read from the document by the document reading unit 107, if thumbnail image data of the read image is generated, the thumbnail image data is stored in the TIFF file along with the original image data.

Figure 4:
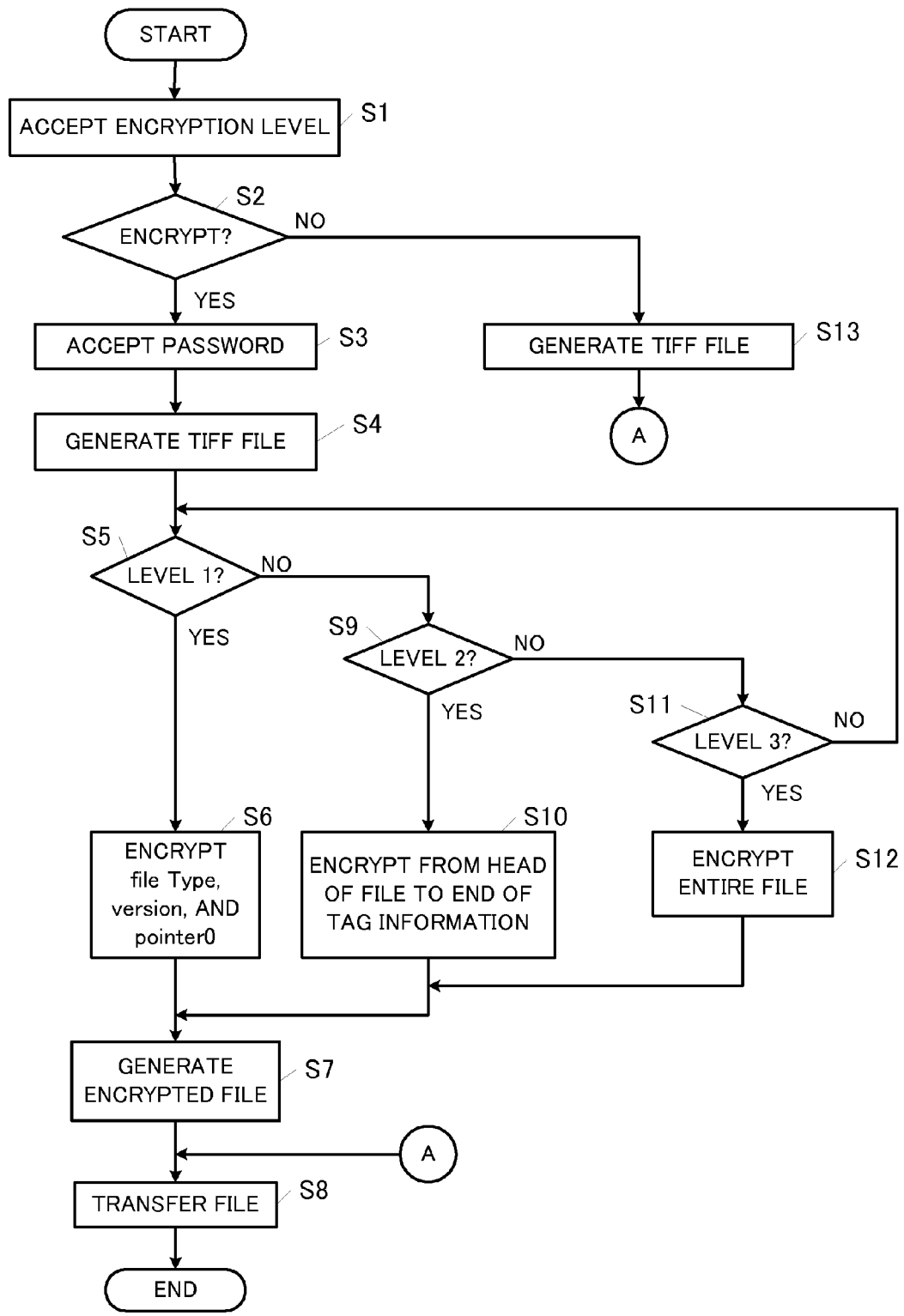
FIG. 4 is a flowchart illustrating an example of a process executed by a CPU when a scan-to-folder function is executed in the Internet facsimile apparatus 1.

The process to be executed by the CPU 101 when the document is scanned in the Internet facsimile apparatus 1 will now be described using the flowchart of FIG. 4 and the like. The CPU 101 executes the process illustrated in the flowchart of FIG. 4 according to the control program stored in the ROM 102. The process illustrated in the flowchart of FIG. 4 is merely an example, and the order of execution may be changed as long as the present invention can be implemented even if the order of executing the process is changed.

Figure 6:
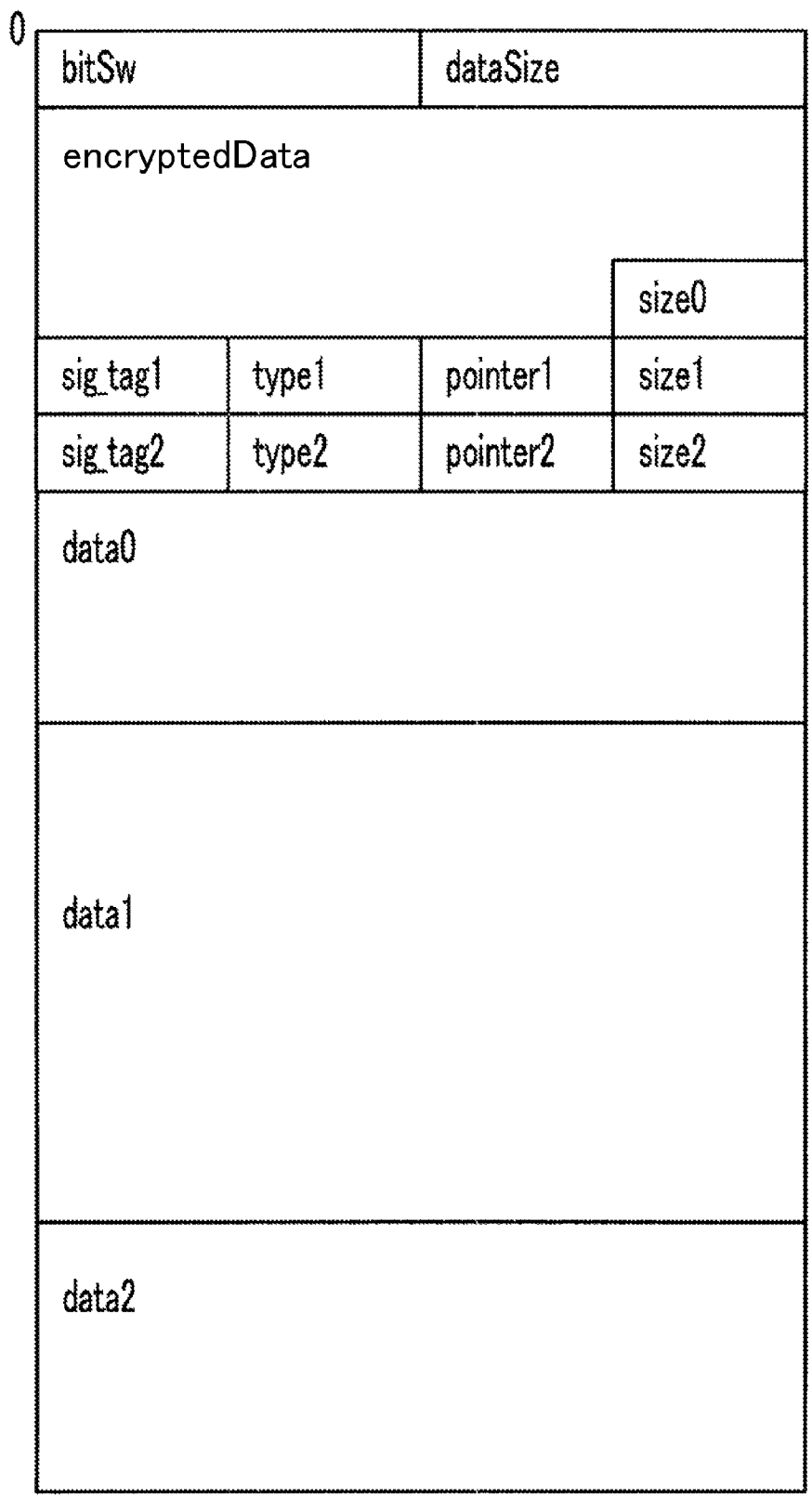
FIG. 6 is an explanatory view illustrating a data structure example of an encrypted file generated when the scan-to-folder function is executed in the Internet facsimile apparatus.

First, when the user selects the scan mode by performing a predetermined operation on the operation unit 105, the CPU 101 displays a screen as illustrated in FIG. 6 on the liquid crystal display of touch panel type of the display unit 106 for the user to select an encryption level of the image file generated by the scan. As illustrated in FIG. 5, "no encryption", "level 1", "level 2", and "level 3" are displayed on the liquid crystal display as options of the encryption level. Regarding "level 1" to "level 3", larger level number provides stronger encryption strength. When the user taps the liquid crystal display or inputs one of "1" to "4" with the ten key of the operation unit 105 based on the screen illustrated in FIG. 5, the CPU 101 accepts the selection of the encryption level corresponding to the relevant tap or the input (S1).

After accepting the selection of encryption level, the CPU 101 judges whether or not to execute encrypting (S2). The CPU 101 judges to execute encryption when accepting one of "level 1" to "level 3" for the encryption level (S2: YES), and determines not to execute the encryption when accepting "no encryption" (S2: NO). When judging to execute the encryption, the CPU 101 displays a predetermined screen on the liquid crystal display of the display unit 106, and urges the user to input a password. This password serves as an encryption key when encrypting the TIFF file and also as a decryption key when decrypting the encrypted TIFF file. When the user inputs the password by tapping the liquid crystal display or operating the key of the operation unit 105 according to the screen displayed on the liquid crystal display of the display unit 106, the CPU 101 accepts the input of the password (S3).

After accepting the input of the password, the CPU 101 displays a message such as "Scan may be performed. Set the document and push the START button" on the liquid crystal display of the display unit 106, and urges the user to perform an operation to start scanning the document. When the user pushes the START button to perform the operation to start the scan, the CPU 101 drives the document reading unit 107, reads the document, generates the image data, and generates the TIFF file based on the generated image data (S4).

After generating the TIFF file, the TIFF file is encrypted according to the encryption level specified by the user and accepted in step S1. If the accepted encryption level is "level 1" (S5: YES), the CPU 101 performs the encryption process having the weakest strength on the TIFF file. Specifically, "fileType" and "version" contained in the IFH and "pointer0" contained in the IFD in the data structure of the TIFF file illustrated in FIG. 3 are encrypted (S6). Here, "pointer0" is the information indicating the stored position of the image data (storage start position: offset value from the head of the file) stored at a position closest to the head of the TIFF file. The viewer cannot appropriately reproduce the relevant image data if the position of the head of the stored image data is not recognized. If the image data stored at the head of the file is not appropriately reproduced, the subsequently stored image data also cannot be appropriately reproduced. Therefore, the effect of encryption can be efficiently obtained by encrypting a small amount of data such as encrypting the information indicating the stored position of the image data stored at the position closest to the head of the TIFF file. The respective data of "fileType", "version", and "pointer0" may be individually encrypted, but encryption is collectively performed from the head of the TIFF file to the "pointer0" to simplify the process.

After the encryption process is terminated, the CPU 101 adds the information (bitSw) indicating the range of the encrypted data and the information (dataSize) indicating the amount of the encrypted data to the head of the image file (TIFF file), in which one portion of the data is encrypted, to generate the encrypted file (S7), as illustrated in FIG. 6. In this case, the extension of the file is changed from "tif" to "cip", and the like. In FIG. 6, the portion indicated by "encryptedData" is the encrypted data. The CPU 101 then transfers the file encrypted in this manner to the folder of the client PC 4 registered in advance or to the folder of the client PC 4 specified by the user (S8).

Figure 7:
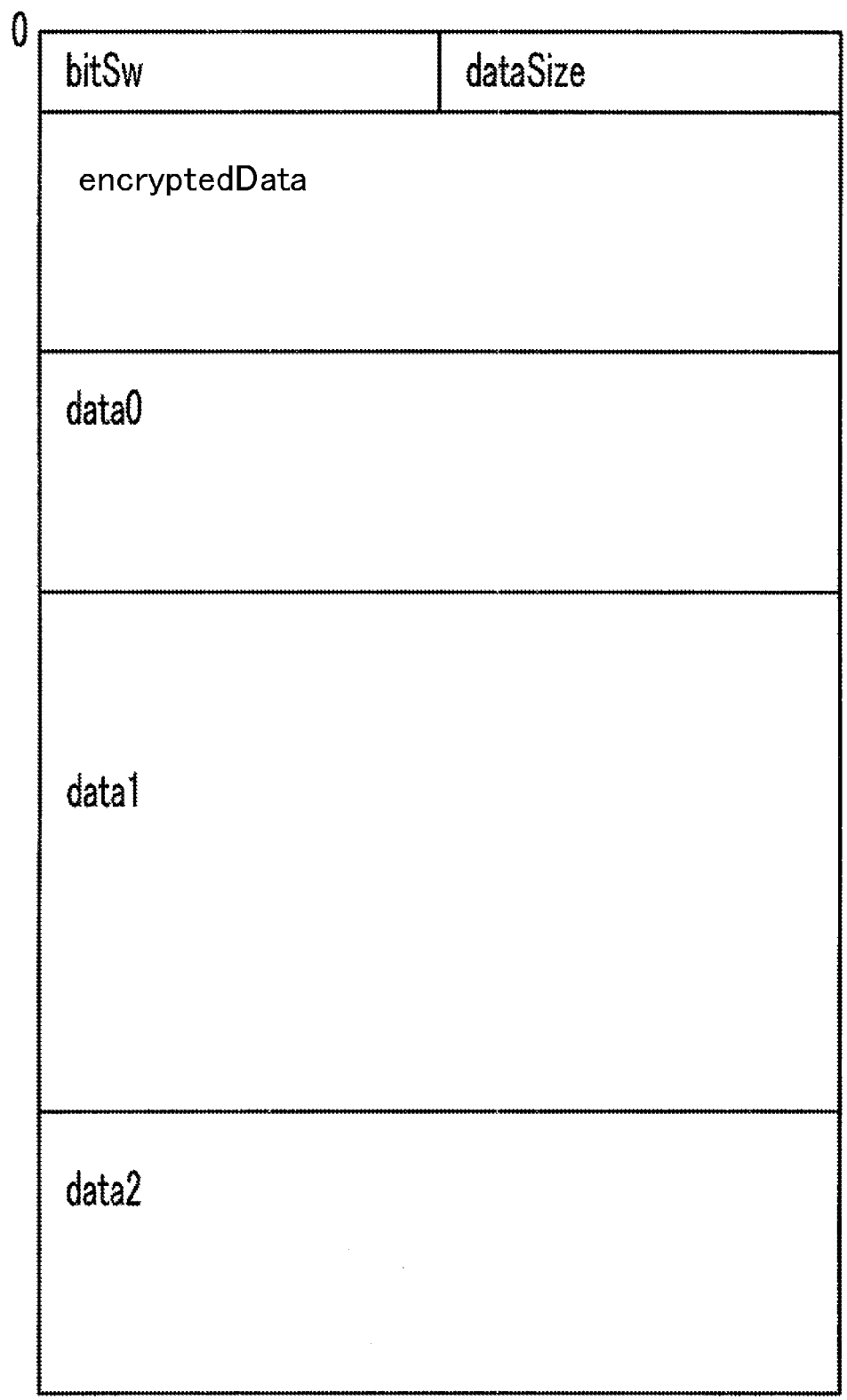
FIG. 7 is an explanatory view illustrating a data structure example of the encrypted file generated when the scan-to-folder function is executed in the Internet facsimile apparatus.

If the encryption level accepted in step S1 is "level 2" (S9: YES), the CPU 101 performs the encryption process having a moderate strength on the TIFF file. Specifically, the head of the IFH, that is, from the head of the TIFF file to the last tag information (size2) in the data structure of the TIFF file illustrated in FIG. 3 are encrypted (S10). After the encryption process is terminated, the CPU 101 adds the information (bitSw) indicating the range of the encrypted data and the information (dataSize) indicating the amount of the encrypted data to the head of the image file (TIFF file), in which one portion of the data is encrypted, to generate the encrypted file (S7), as illustrated in FIG. 7. In this case, the extension of the file is changed from "tif" to "cip", and the like. In FIG. 7, the portion indicated by "encryptedData" is the encrypted data, similar to FIG. 6. The CPU 101 then transfers the file encrypted in this manner to the folder of the client PC 4 registered in advance or to the folder of the client PC 4 specified by the user (S8). The encryption strength becomes higher, and the confidentiality of the information contained as image file in the TIFF file can be enhanced by encryption from the head of the TIFF file to the last tag information (size2).

Figure 8:
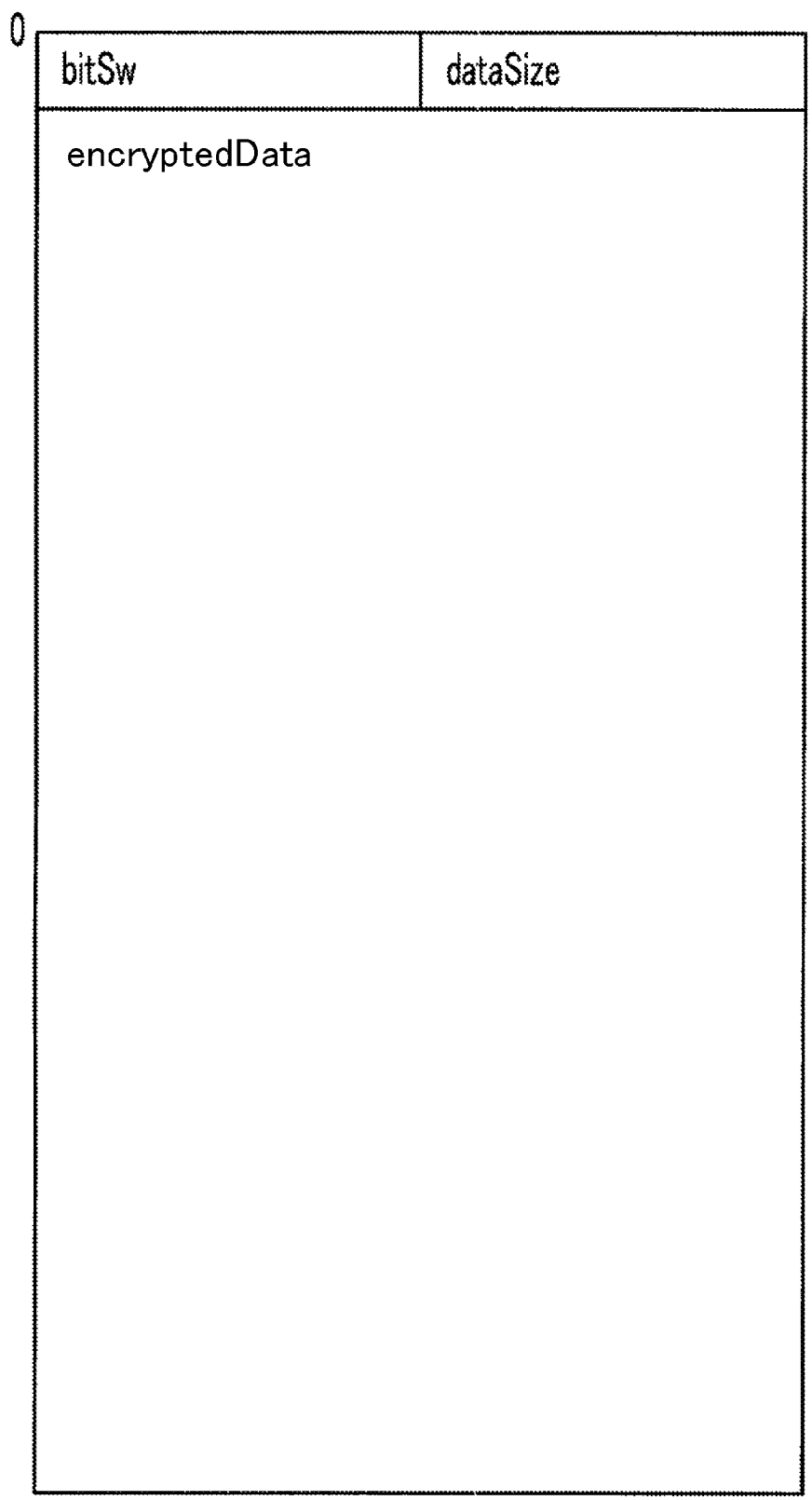
FIG. 8 is an explanatory view illustrating a data structure example of the encrypted file generated when the scan-to-folder function is executed in the Internet facsimile apparatus.

Furthermore, if the encryption level accepted in step S1 is "level 3" (S11: YES), the CPU 101 performs the encryption process having a maximum strength on the TIFF file. Specifically, the entire TIFF file is encrypted (S12). After the encryption process is terminated, the CPU 101 adds the information (bitSw) indicating the range of the encrypted data and the information (dataSize) indicating the amount of the encrypted data to the head of the image file (TIFF file), in which the entire data is encrypted, to generate the encrypted file (S7), as illustrated in FIG. 8. In this case, the extension of the file is changed from "tif" to "cip", and the like. In FIG. 8, the portion indicated by "encryptedData" is the encrypted data, similar to FIGS. 6 and 7. The CPU 101 then transfers the file encrypted in this manner to the folder of the client PC 4 registered in advance or to the folder of the client PC 4 specified by the user (S8). When the entire TIFF file is encrypted, the calculation amount increases thereby imposing a large processing load on the CPU 101, but the confidentiality of the information contained as image data in the TIFF file can be further enhanced.

When judging not to perform the encryption in step S2 (S2: NO), the CPU 101 drives the document reading unit 107, generates the image data by reading the document, and generates the TIFF file based on the generated image data (S13). The CPU 101 then transfers the generated TIFF file to the folder of the client PC 4 registered in advance or to the folder of the client PC 4 specified by the user (S8).

In the client PC 4 which receives the transferred encrypted file, the image data contained in the encrypted file can be reproduced and displayed with a browser incorporating a dedicated plug-in viewer having a function of decrypting the encrypted file.

In the Operating System (OS) of the client PC 4, "cip", which is the extension of the encrypted file, and the dedicated plug-in viewer are stored in association with each other. The dedicated plug-in viewer of the browser is activated by clicking the file having the extension of "cip" displayed on the folder. The plug-in viewer first displays a window for inputting the password on a monitor of the client PC 4. When the user of the client PC 4 inputs the password in the window, the plug-in viewer decrypts the clicked encrypted file with the input password as the decryption key. Specifically, the encrypted data is specified based on the information (bitSw) indicating the range of the encrypted data and the information (dataSize) indicating the amount of the encrypted data stored at the head of the clicked file, and the specified data is decrypted. The plug-in viewer then specifies the position etc. of the image data in the file from the decrypted data (pointer0 etc.), and displays the image data on the browser by reading the image data from the specified position.

As described above, according to the Internet facsimile apparatus 1 of a preferred embodiment of the present invention, "fileType" and "version" contained in the IFH and "pointer0" contained in the IFD of the TIFF file may be encrypted, or the IFH and the tag information may be encrypted, without encrypting the image data contained in the TIFF file. Therefore, the amount of data to be encrypted is significantly smaller than the amount of data of the entire TIFF file, and thus the calculation amount necessary for the encryption process becomes small and the processing load imposed on the CPU 101 in time of encryption process becomes small. The processing ability of other functions is thereby prevented from decreasing during the encryption process. Furthermore, the time required for the encryption process can be reduced.

The present invention is not limited to the preferred embodiment above, and various modifications may be made within the scope of the concept of the invention. For instance, the image data of the scanned document preferably is a file of TIFF format in the above-described preferred embodiment, but the file format is not limited to the TIFF format and maybe the PDF format or the JPEG format.

The encrypted file does not have a device that detects a decryption error in the preferred embodiment described above, but a hash value may be generated in time of encryption, and such hash value may be included in the encrypted file. In this manner, detection can be made that the password is wrong and that decryption is not properly performed, and such detection can be notified to the user, when the plug-in viewer of the browser performs decryption in the client PC 4.

Furthermore, there are preferably three encryption levels of strong, moderate, and weak provided in the above described preferred embodiment, but the number of the encryption levels is not limited thereto and may be at most three levels (three or less levels) or at least three levels (three or more levels).

The boundary of the data to be encrypted preferably is in data units such as "pointer0" in the preferred embodiment described above, but the boundary may be at the middle of the data of "pointer0" and the like. That is, if the "pointer0" is data of four bytes, the data boundary to be encrypted may be the second byte of "pointer0", so that encryption is performed from the head of the TIFF file to the second byte of "pointer0".

The present invention is applicable to the image processing apparatus for outputting image data of the scanned document as a file.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. An image processing apparatus comprising:
   an image data generation device arranged to generate image data by reading a document;
   an image file generation device arranged to generate an image file from the image data generated by the image data generation device, the image file containing a plurality of image data; and
   an encryption device arranged to encrypt file format information and file structure information contained in the image file generated by the image file generation device while not encrypting the image data contained in the image file; wherein
   the file structure information includes information indicating stored positions of the plurality of image data contained in the image file;
   the encryption device encrypts at least information indicating a stored position of the image data of the plurality of image data that is stored at a position closest to a head of the image file and does not encrypt information indicating a stored position of any of the plurality of image data that is stored after the position closest to the head of the image file; and
   the encryption device generates an encrypted file with information indicating a range of encrypted data added to the head of the image file in which a portion of or all of the data is encrypted.

2. The image processing apparatus according to claim 1, wherein the encryption device encrypts the information using at least one encryption level.

3. The image processing apparatus according to claim 2, wherein an encrypted file is generated with information indicating an amount of the encrypted data added to the head of the image file in which a portion of or all of the data is encrypted.

4. The image processing apparatus according to claim 3, wherein an extension of the encrypted file is changed.

5. The image processing apparatus according to claim 4, wherein a hash value is generated during encryption, and the hash value is contained in the encrypted file.

6. An encryption processing method comprising the steps of:
   generating image data by reading a document with an image data generation device;
   generating an image file from the generated image data with an image file generation device; and
   encrypting file format information and file structure information contained in the generated image file with an encryption device without encrypting the image data contained in the image file; wherein
   the file structure information includes information indicating stored positions of the plurality of image data contained in the image file;
   the encryption device encrypts at least information indicating a stored position of the image data of the plurality of image data that is stored at a position closest to a head of the image file and does not encrypt information indicating a stored position of any of the plurality of image data that is stored after the position closest to the head of the image file; and
   the encryption device generates an encrypted file with information indicating a range of encrypted data added to the head of the image file in which a portion of or all of the data is encrypted.

* * * * *